United States Patent [19]

Kume et al.

[11] Patent Number: 5,948,716
[45] Date of Patent: Sep. 7, 1999

[54] CUBIC BORON NITRIDE BASED SINTERED MATERIAL AND ITS PRODUCING METHOD

[75] Inventors: Shoichi Kume, Tsushima; Kazutaka Suzuki, Komaki; Yoshinori Nishida, Kasugai; Haruo Yoshida, Tsukuba; Yasuhiro Enya, Chiryu; Akinari Ishikawa; Takashi Sakurai, both of Kariya, all of Japan

[73] Assignees: National Industrial Research Institute of Nagoya, Nagoya; Aisin Seiki Kabushiki Kaisha, Kariya, both of Japan

[21] Appl. No.: 08/997,731

[22] Filed: Dec. 24, 1997

[30] Foreign Application Priority Data

Dec. 25, 1996 [JP] Japan ..................................... 8-357215

[51] Int. Cl.⁶ .................................................... C04B 35/58
[52] U.S. Cl. ........................ 501/96.4; 501/127; 501/96.1; 501/98.4; 428/704; 428/698; 428/403; 428/404
[58] Field of Search .................................. 501/96.4, 96.1, 501/127, 98.4; 51/307, 309; 428/704, 698, 403, 404

[56] References Cited

U.S. PATENT DOCUMENTS 5,328,875  7/1994  Ueda et al. ............................. 501/96.4
5,466,642  11/1995  Tajima et al. ........................... 501/96.4
5,569,862  10/1996  Kuroyama et al. ..................... 501/96.4
5,639,285  6/1997  Yao et al. ............................... 501/96.4
5,691,260  11/1997  Suzuki et al. ............................. 51/307
5,700,551  12/1997  Kukino et al. ............................ 51/307

FOREIGN PATENT DOCUMENTS 0701 982 A1  9/1995  European Pat. Off. .
5-78107  3/1993  Japan .

*Primary Examiner*—Michael Marcheschi
*Attorney, Agent, or Firm*—Oblon, Spivak, McClelland, Maier & Neustadt, P.C.

[57] ABSTRACT

The purpose of the present invention is to provide a cubic boron nitride based sintered material having excellent durability and capable of cutting at least spheroidal graphite cast iron at high speed and usable in a cutting tool having a long life, and a production method of this cubic boron nitride based sintered material. The present invention resides in a production method of a cubic boron nitride based sintered material characterized in that a mixing raw material is produced by mixing powder of $Ti_{(1-x)}Al_xN(x=0.05{\sim}0.70)$ and the powder of a cubic boron nitride, and is next sintered. A compounding ratio of the above mixing raw material is preferably set such that this mixing raw material includes 10 to 90% of the above $Ti_{(1-x)}Al_xN(x=0.05{\sim}0.70)$ by volume and 10 to 90% of the above cubic boron nitride by volume.

37 Claims, 1 Drawing Sheet

CUBIC BORON NITRIDE BASED SINTERED MATERIAL AND ITS PRODUCING METHOD

BACKGROUND OF THE INVENTION

1. Field of the Invention

The present invention relates to a cubic boron nitride based sintered material effectively utilizable as the material of a tool for high speed cutting spheroidal graphite cast iron, etc., and a production method of this cubic boron nitride based sintered material.

2. Description of the Related Arts

The spheroidal graphite cast iron is cast iron in which spheroidal graphite is crystallized by adding cerium (Ce) or magnesium (Mg) (or a Mg alloy) into a molten bath of low sulfur (S) (<0.02%) and low phosphorus (P) (<0.2%). The spheroidal graphite cast iron has high tensile strength and relatively large tenacity in comparison with common cast iron. Therefore, the spheroidal graphite cast iron is widely used as a material of mechanical parts requiring strength and is also used in many cases as trunk important parts mainly constituting an automobile by its recent higher performance.

Cutting work of the spheroidal graphite cast iron is normally required after casting to set this spheroidal graphite cast iron to have a final shape size of the above trunk important parts, etc. A cutting work tool of the spheroidal graphite cast iron must have performance capable of rapidly processing this spheroidal graphite cast iron without any waste with required processing accuracy. When a tool edge is worn and damaged by chipping, etc., fins are caused on a processing surface of the spheroidal graphite cast iron, etc. so that no required size accuracy and surface roughness are obtained. Accordingly, a defective product is formed so that this defective product cannot be forwarded as produced goods.

Therefore, when the above tool wearing and chipping damage, etc. are caused, the cutting work tool must be immediately exchanged. This tool exchange must be reduced as much as possible since this tool exchange causes a reduction in productivity.

Accordingly, a cutting work tool having a long life and undamaged by chipping, etc. without any wearing of the above tool edge is strongly desired to cut the spheroidal graphite cast iron at high speed.

For example, a ceramic sintered body constructed by TiC, $Al_2O_3$ and SiC whiskers as described in Japanese Published Patent No. 8-16028 is proposed as a cutting work tool for solving the above disadvantages.

As described in Japanese Published Patent No. 64-4986, a cubic boron nitride based sintered material having a binding material constructed by $Ti_2AlN$ and one or two kinds among $Si_3N_4$ and $Al_2O_3$ is proposed as a cutting work tool for cast iron. Further, Japanese Published Patent No. 64-4987 proposes a cubic boron nitride based sintered body characterized in that $Si_3N_4$, $Si_2W$ and $Ti_2AlN$ constitute a binding material.

However, there are the following problems with respect to a cubic boron nitride based sintered material used in the above conventional cutting tool for the spheroidal graphite cast iron, etc.

Namely, no cubic boron nitride is included in the ceramic sintered body constructed by the above TiC, $Al_2O_3$ and SiC whiskers. Therefore, there is a merit in that the ceramic sintered body can be cheaply produced. However, no ceramic sintered body can have durability for realizing a long life at a desired level.

In contrast to this, it is considered that the above cubic boron nitride based sintered body shows excellent performance with respect to general cast iron in comparison with the ceramic sintered body including the above SiC whiskers.

However, the above conventional cubic boron nitride based sintered body shows the excellent performance with respect to the general cast iron, but no satisfied durability can yet be obtained with respect to the spheroidal graphite cast iron including magnesium (Mg) as an active metal and difficult to be processed.

SUMMARY OF THE INVENTION

In consideration of such conventional problem points, the present invention provides a cubic boron nitride based sintered material having excellent durability and capable of cutting at least spheroidal graphite cast iron at high speed and usable in a cutting tool having a long life, and also provides a production method of this cubic boron nitride based sintered material.

The present invention resides in a production method of a cubic boron nitride based sintered material characterized in that a mixing raw material is produced by mixing powder of $Ti_{(1-x)}Al_xN(x=0.05\sim0.70)$ and the powder of a cubic boron nitride, and is next sintered.

The most noticeable features of the present invention are that the titanium aluminum nitride $Ti_{(1-x)}Al_xN(x=0.05\sim0.70)$ having the above specific composition is used as a binding material of the cubic boron nitride.

The above $Ti_{(1-x)}Al_xN(x=0.05\sim0.70)$ has the crystal structure of B1 type, which is one of the cubic system, similar to that of TiN. However, aluminum (Al) is continuously solid-soluble in a TiN crystal so that this $Ti_{(1-x)}Al_xN(x=0.05\sim0.70)$ has excellent physical properties different from those of TiN. An oxidation resisting property is improved or hardness is increased within a range of the above x from 0.05 to 0.70.

When this x is smaller than 0.05, a problem exists in that this $Ti_{(1-x)}Al_xN(x=0.05\sim0.70)$ is not substantially different from TiN and cannot show the above excellent physical properties. In contrast to this, when the above x exceeds 0.70, a problem exists in that no crystal structure of $Ti_{(1-x)}Al_xN$ has the B1 type cubic system and no $Ti_{(1-x)}Al_xN$ can show the above excellent physical properties.

DETAILED DESCRIPTION OF THE INVENTION

Figure 1:
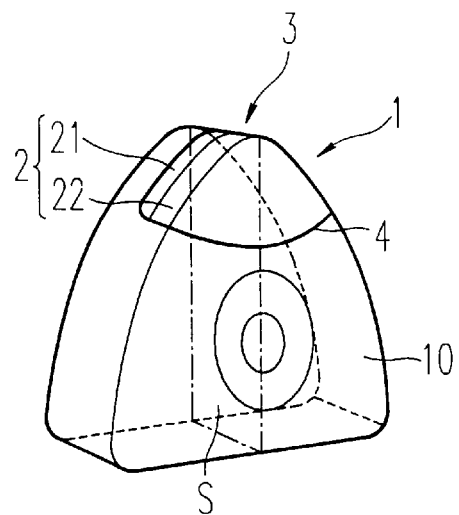
FIG. 1 is a perspective view of the cutting tool according to Embodiment 1.

In the present invention, a titanium aluminum nitride $Ti_{(1-x)}Al_xN(x=0.05\sim0.70)$ having the above specific composition can be produced by various kinds of methods.

For example, the titanium nitride aluminum $Ti_{(1-x)}Al_xN$ (x=0.05~0.70) is evaporated on the surface of a substrate material such as $Sio_2$, MgO, etc. by a physical vapor deposition (PVD) method. Thereafter, the substrate material is dissolved by an alkali or an acid and the remaining $Ti_{(1-x)}Al_xN(x=0.05\sim0.70)$ is next crushed to powder.

In the above PVD method, for example, there are a sputtering method and an ion plating method executed under a nitrogen pressure reducing atmosphere with an intermetallic compound of titanium (Ti) and aluminum (Al) as a target.

A chemical vapor deposition (CVD) method can be also used instead of the above PVD method. Concretely, for example, there is a plasma CVD method in which $TiCl_4$, $AlCl_3$ and $NH_3$ or $N_2$ (suitably $N_2$) are used as a raw material gas, and argon (Ar) and $H_2$ are used as a carrier gas.

For example, in the case of said PVD method (the sputtering method and the ion plating method), in order to adjust the above x to a range from 0.05 to 0.70, a plate material constituted of an alloy whose composition in which a mole ratio of Ti:Al ranges from 0.30:0.70 to 0.95:0.05 is prepared by a powder metallurgy method. This plate material is used as a target. Or otherwise, titanium plate material and aluminum plate material are prepared, and then arranged such that an area ratio of Ti:Al ranges from 0.30:0.70 to 0.95:0.05, converting into a mole ratio. These titanium and aluminum plate materials are used as targets.

Further, for example, an $N_2$ partial pressure is adjusted in a range from $1\times10^{-3}$ to $1\times10^{-1}$ Pa in an atmosphere at a PVD processing time. When this $N_2$ partial pressure is smaller than $1\times10^{-3}$ Pa, a problem exists in that titanium and aluminum are not nitrided. In contrast to this, when the above $N_2$ partial pressure exceeds $1\times10^{-1}$ Pa, a problem exists in that AlN is generated. Therefore, it is desirable to preferably set the $N_2$ partial pressure to about $1\times10^{-2}$ Pa. Argon (Ar) is used as a gas for generating a plasma.

In the case of the plasma CVD method, the above x is adjusted to a range from 0.05 to 0.70 by adjusting a gaseous partial pressure ratio of $AlCl_3/TiCl_4$. A boiling point of $AlCl_3$ is 100.4 kPa under 183° C. $AlCl_3$ is heated to a temperature equal to or higher than this boiling point to hold its gaseous state in a range from 4.0 to 101.1 kPa and is supplied into CVD device. However, since the boiling point is reduced under a reduced pressure, these materials can be held in a gaseous state even at about 150° C. in the case of e.g., about 5.0 kPa.

$TiCl_4$ is adjusted in a range from 4.0 to 101.1 kPa. When the partial pressure of this $TiCl_4$ is low (e.g., about 5 kPa), it is not necessary to heat the above materials. In contrast to this, when the partial pressure of $TiCl_4$ is adjusted to a higher pressure equal to or higher than several 10 kPa, it is necessary to heat the above materials in advance to hold the gaseous state. It is necessary to heat flowing passages of these gases to a temperature equal to or higher than at least the above temperature so as to prevent condensation of these gases.

It can be checked by an energy diffusive type X-ray analysis whether or not the value x of the obtained $Ti_{(1-x)}Al_xN$ lies in a predetermined range. Further, a change in crystal structure recognized in the case of the above x exceeding 0.70 can be checked by X-ray diffraction.

A particle diameter of powder of the above $Ti_{(1-x)}Al_xN$ (x=0.05~0.70) is preferably set to be smaller than a particle diameter of cubic boron nitride powder described later. When the particle diameter of the above $Ti_{(1-x)}Al_xN$(x=0.05~0.70) powder exceeds 10 μm, a problem exists in that it is difficult to uniformly distribute $Ti_{(1-x)}Al_xN$ as a binding material around cubic boron nitride particles. The particle diameter is preferably set to be equal to or smaller than 1 μm. It is necessary to allow impurities not to mix with the above powder at a crushing time.

Next, the above cubic boron nitride (hereinafter, suitably called cBN) is a boron nitride (BN) having a cubic type, which is the zinc-blende structure, synthesized by ultrahigh pressure. Hardness of this cubic boron nitride is next to diamond. No sintering for directly binding cubic boron nitride particles to each other can be performed unless pressure is an ultrahigh pressure and temperature is an ultra-high temperature. Accordingly, it is indispensable that the above $Ti_{(1-x)}Al_xN$(x=0.05~0.70) is distributed onto surfaces of the cubic boron nitride particles.

The particle diameter of the above cubic boron nitride powder is preferably set to range from 0.5 to 10 μm when only a wear resisting property of the obtained sintered material is seriously considered. When this particle diameter is smaller than 0.5 μm, a problem exists in that it is difficult to distribute $Ti_{(1-x)}Al_xN$(x=0.05~0.70) around the cubic boron nitride particles. In contrast to this, when this particle diameter exceeds 10 μm, a problem exists in that a shock resisting property is reduced.

For example, when the obtained sintered material is used as a cutting tool of the spheroidal graphite cast iron, it is preferable to set the above particle diameter to range from 0.5 to 5 μm. When the particle diameter is smaller than 0.5 μm, there is a problem similar to the above problem. In contrast to this, when the particle diameter exceeds 5 μm, it is difficult to finish the tool and a problem exists in that the sintered material is easily chipped in intermittent cutting. Accordingly, the particle diameter is preferably equal to or greater than 0.5 μm and is preferably equal to or smaller than 3 μm. This particle diameter is more preferably equal to or greater than 0.5 μm and is more preferably equal to smaller than 2 μm.

Next, for example, a mixing raw material of the above $Ti_{(1-x)}Al_xN$(x=0.05~0.70) powder and the cubic boron nitride power is sintered by an ultrahigh pressure sintering method. For example, temperature is set to range from 1100 to 1600° C. and pressure is set to range from 2.0 to 7.0 GPa in this ultrahigh pressure sintering method.

An operation of the present invention will next be explained.

In the production method of the cubic boron nitride based sintered material in the present invention, a mixing raw material of $Ti_{(1-x)}Al_xN$(x=0.05~0.70) powder having the above specific compound and the cubic boron nitride powder is sintered. Thus, the obtained cubic boron nitride based sintered material shows excellent durability when this cubic boron nitride based sintered material is used in a cutting tool.

No conventional sintered body can have sufficient durability even when this sintered body includes the cubic boron nitride. It is considered that this is because a binding material itself has low durability.

In contrast to this, in the present invention, the above $Ti_{(1-x)}Al_xN$(x=0.05~0.70) is used as a binding material and the above x is limited to a range from 0.05 to 0.70. Therefore, the binding material itself has very high hardness, an excellent oxidation resisting property and excellent durability.

Therefore, for example, the cubic boron nitride based sintered material obtained in the present invention can be effectively used in a cutting tool, a pit for drilling, etc. since the cubic boron nitride and the binding material have excellent durability. For example, when the cubic boron nitride based sintered material is used in a cutting tool for the spheroidal graphite cast iron, the cutting tool can perform high speed cutting. Dropping of the cubic boron nitride, etc. can be prevented in this cutting tool and the cutting tool can have an excellent wear resisting property and an excellent chipping damage resisting property.

A compounding ratio of the above mixing raw material is preferably set such that this mixing raw material includes 10 to 90% of the above $Ti_{(1-x)}Al_xN(x=0.05\sim0.70)$ by volume and 10 to 90% of the above cubic boron nitride by volume.

When the compounding ratio of the above $Ti_{(1-x)}Al_xN(x=0.05\sim0.70)$ is smaller than 10%, the compounding ratio of the cubic boron nitride exceeds 90% so that no $Ti_{(1-x)}Al_xN$ ($x=0.05\sim0.70$) is dispersed around cubic boron nitride particles. Therefore, a problem exists in that binding of these cubic boron nitride particles is extremely weak and vacant spaces are left between the cubic boron nitride particles so that no mixing raw material can be used as a cutting tool.

In contrast to this, when the compounding ratio of the above $Ti_{(1-x)}Al_xN(x=0.05\sim0.70)$ exceeds 90%, the compounding ratio of the cubic boron nitride is smaller than 10%. In this case, a problem exists in that no effects provided by including the cubic boron nitride having excellent characteristics such as high hardness, etc. can be shown. The compounding ratio of the cubic boron nitride is preferably set to range from 20 to 80%.

The next invention is a method in which covered particles provided by covering the surfaces of cubic boron nitride particles with $Ti_{(1-x)}Al_xN(x=0.05\sim0.70)$ in advance are used instead of the above mixing raw material.

Namely, this invention is a production method of the cubic boron nitride based sintered material characterized in that the covered particles are produced by covering the surfaces of the cubic boron nitride particles with 5 to 90% of $Ti_{(1-x)}Al_xN(x=0.05\sim0.70)$ by volume and are next sintered.

The most noticeable features in this production method are that the surfaces of the cubic boron nitride particles are covered with $Ti_{(1-x)}Al_xN(x=0.05\sim0.70)$ in advance as mentioned above. Thus, it is possible to obtain a sintered material in which the cubic boron nitride particles are uniformly dispersed in $Ti_{(1-x)}Al_xN(x=0.05\sim0.70)$ in a fine structure state by sintering the above covered particles.

For example, the above covered particles can be produced by directly generating $Ti_{(1-x)}Al_xN(x=0.05\sim0.70)$ on the surfaces of the cubic boron nitride particles using the above production method of $Ti_{(1-x)}Al_xN(x=0.05\sim0.70)$. Namely, a saucer arranging cubic boron nitride powder thereon is used instead of the above substrate in the above PVD and CVD methods, and $Ti_{(1-x)}Al_xN(x=0.05\sim0.70)$ is evaporated to this saucer so that the covered particles can be obtained.

For example, a gaseous phase covering method clearly shown in the production method of a covering cubic boron nitride sintered body described in Japanese Laid-Open Patent No. 7-53268 can be preferably used to the covered particles so as to uniformly form the covered particles. Otherwise, a gaseous phase covering method described in Japanese Laid-Open Patent No. 61-30663 or 58-31076 may be also used.

When the compounding ratio of the above $Ti_{(1-x)}Al_xN(x=0.05\sim0.70)$ is smaller than 5%, this $Ti_{(1-x)}Al_xN(x=0.05\sim0.70)$ can be distributed as a binding material onto contact faces between the cubic boron nitride particles. Therefore, the binding between the cubic boron nitride powder particles is relatively strong. However, similar to the above case, vacant spaces are left between the cubic boron nitride particles. Accordingly, a problem exists in that tenacity is reduced with these vacant spaces as breaking starting points so that a tool life is short. The compounding ratio of $Ti_{(1-x)}Al_xN(x=0.05\sim0.70)$ is preferably set to be equal to or greater than 15% by volume.

In contrast to this, when the compounding ratio of $Ti_{(1-x)}Al_xN(x=0.05\sim0.70)$ exceeds 90%, a problem similar to the above problem exists and a problem also exists in that cost required to cover the above particle surfaces is increased. The compounding ratio of $Ti_{(1-x)}Al_xN(x=0.05\sim0.70)$ is preferably set to be equal to or smaller than 45% by volume.

The next invention is a method for sintering a mixing raw material provided by further mixing particles of $Ti_{(1-x)}Al_xN(x=0.05\sim0.70)$ with the above covered particles.

Namely, this invention is a production method of the cubic boron nitride based sintered material characterized in that the surfaces of cubic boron nitride particles are covered with $Ti_{(1-x)}Al_xN(x=0.05\sim0.70)$ so that covered particles are produced and a mixing raw material is next produced by mixing these covered particles with $Ti_{(1-x)}Al_xN(x=0.05\sim0.70)$ powder and is next sintered.

In this case, when a relatively large amount of $Ti_{(1-x)}Al_xN(x=0.05\sim0.70)$ is included in the cubic boron nitride based sintered material, effects obtained in a using case of the above covered particles can be shown while production cost of the covered particles is reduced.

Namely, for example, when the cubic boron nitride based sintered material is set to include 90% of $Ti_{(1-x)}Al_xN(x=0.05\sim0.70)$ as an example, a covering ratio of $Ti_{(1-x)}Al_xN(x=0.05\sim0.70)$ with respect to the cubic boron nitride is set to be equal to or smaller than 30% by volume, and the remaining 60% of $Ti_{(1-x)}Al_xN(x=0.05\sim0.70)$ is mixed with the covered particles as $Ti_{(1-x)}Al_xN(x=0.05\sim0.70)$ powder.

Thus, production cost can be restrained in comparison with a case in which the cubic boron nitride particles are covered with all $Ti_{(1-x)}Al_xN(x=0.05\sim0.70)$ to be included. Further, it is also possible to obtain effects provided when the above covered particles are used.

The above x is preferably set to range from 0.05 to 0.15 or range from 0.50 to 0.70. Namely, life of the obtained sintered material can be further lengthened by further limiting the above x in the above $Ti_{(1-x)}Al_xN(x=0.05\sim0.70)$ to the range from 0.05 to 0.15 or the range from 0.50 to 0.70.

It is not necessarily clear why the cubic boron nitride based sintered material shows a long life by limiting the value x to the above range. However, it is considered as influences that hardness of the above $Ti_{(1-x)}Al_xN$ becomes very high with $0.10(\pm0.02)$ as a first peak of the value x and $0.60(\pm0.02)$ as a second peak of the value x, and an oxidation resisting property of the above $Ti_{(1-x)}Al_xN$ becomes high with $0.60(\pm0.02)$ as a peak of the value x.

0.2 to 11.1% of an additive by volume constructed by $TiO_y(y=1\sim2)$ and/or $Al_2O_3$ is preferably externally added to the above cubic boron nitride based sintered material. Thus, the life of the cubic boron nitride based sintered material can be further lengthened.

$TiO_y$ is a titanium oxide such as $Ti_3O_5$, $Ti_4O_7$, etc. in which y can range from 1 to 2. The life of the cubic boron nitride based sintered material can be lengthened by externally adding this $TiO_y$ to the cubic boron nitride based sintered material within the range of y from 1 to 2. Further, no effects with respect to this life lengthening using $TiO_y$ are almost changed within the above range of y from 1 to 2 so that these effects are preferable.

Similar to the case of $Tio_y$, the life of the cubic boron nitride based sintered material can be also lengthened when $Al_2O_3$ is externally added to the cubic boron nitride based sintered material.

When external adding ratios of $TiO_y(y=1\sim2)$ and/or $Al_2O_3$ are smaller than 0.2%, a problem exists in that the above effects of the life lengthening are unclear. In contrast to this, when these external adding ratios exceeds 11.1%, a problem exists in that the life of the cubic boron nitride based sintered material is reversely shortened.

The next invention is a cubic boron nitride based sintered material obtained by the above excellent production method.

Namely, this cubic boron nitride based sintered material is characterized in that this cubic boron nitride based sintered material includes 5 to 90% of $Ti_{(1-x)}Al_xN(x=0.05\sim0.70)$ by volume and 10 to 95% of a cubic boron nitride based sintered material by volume.

The reasons for limiting these adding amounts are similar to those in the above case.

The above x is preferably set to range from 0.05 to 0.15 or range from 0.50 to 0.70. In this case, life of the cubic boron nitride based sintered material can be lengthened as mentioned above.

0.2 to 11.1% of an additive by volume constructed by $TiO_y(y=1\sim2)$ and/or $Al_2O_3$ is preferably externally added to the above cubic boron nitride based sintered material. In this case, the life of the cubic boron nitride based sintered material can be further lengthened as mentioned above.

As mentioned above, the present invention can provide a cubic boron nitride based sintered material having excellent durability and capable of cutting at least spheroidal graphite cast iron at high speed and usable in a cutting tool having a long life, and can also provide a production method of this cubic boron nitride based sintered material.

EMBODIMENTS

Embodiment 1

A cubic boron nitride based sintered material and its production method in an embodiment example of the present invention will be explained by using FIGS. 1 to 3.

In this example, cubic boron nitride based sintered materials having various kinds of compositions are produced by various kinds of methods. A cutting tool is constructed by using each of these cubic boron nitride based sintered materials as a cutting tool material and a life lengthening property of this cutting tool is evaluated. Tables 1 and 2 show a production method of $Ti_{(1-x)}Al_xN$ in the produced cubic boron nitride based sintered material, a compounding amount of each of raw materials, a production condition, evaluated results described later, etc. All the compounding amounts are shown as internal adding amounts.

Produce of the cutting tool material using the cubic boron nitride based sintered material will first be explained. In this example, the cutting tool material is mainly produced by three kinds of production methods.

In a first production method, a mixing raw material provided by mixing the powder of $Ti_{(1-x)}Al_xN$ with cubic boron nitride powder is sintered.

Concretely, a thin film of $Ti_{(1-x)}Al_xN$ having various kinds of x-values by a plasma CVD method is first produced. In the plasma CVD method in this example, $N_2$, $AlCl_3$ and $TiCl_4$ are used as raw material gases of this thin film, and the above x-values are adjusted by adjusting a gaseous partial pressure ratio of $AlCl_3/TiCl_4$. Argon (Ar) is used as a carrier gas.

In the other conditions, pressure is set to range from $1.0\times10^{-2}$ to $1.0\times10^{-3}$ torr and temperature is set to range from about 400 to about 800° C.

$Ti_{(1-x)}Al_xN$ is evaporated onto a substrate constructed by aluminum (Al) or $SiO_2$ so that thin film of $Ti_{(1-x)}Al_xN$ is obtained. Next, after this thin film is separated from the substrate, the thin film is crushed by a crusher made of SiC so that powder of $Ti_{(1-x)}Al_xN$ having an average particle diameter of 1 μm is obtained. Further, in addition to the above plasma CVD method, the $Ti_{(1-x)}Al_xN$ powder is produced by the ion plating method as a PVD method.

Cubic boron nitride powder having 2 μm in average particle diameter is next used as the above cubic boron nitride powder. $TiO_y$ powder and $Al_2O_3$ powder are also used in accordance with necessity. These powders are compounded and mixed with each other in a ball mill for three hours and are then dried and molded by a die as a mixing raw material.

Next, in this example, this mixing raw material is overlapped with a plate molding body for a base seat separately prepared and is sintered at an ultrahigh pressure. Thus, a cutting tool material having the cubic boron nitride based sintered material laminated with the base seat plate is obtained.

In a condition of the above ultrahigh pressure sintering, pressure is set to range from 2.5 to 6.5 GPa and temperature is set to range from 1100 to 1400° C. and a sintering time is set to range from 15 to 180 minutes. The above plate molding body for a base seat is formed by molding WC powder including 10% of Co powder by weight using a die.

In this example, as shown in the tables 1 and 2, cutting tool materials having various kinds of compositions of sample Nos. E4, E4, E6 to E8, C1 to C3 and C5 are obtained by adjusting a compounding ratio of each of the above powders, etc. Here, the sample Nos. E1, E4, E6 to E8, C1, C2 and C5 show cutting tool materials in which $Ti_{(1-x)}Al_xN$ powder is produced by the plasma CVD method. The sample No. C3 shows a cutting tool material in which $Ti_{(1-x)}Al_xN$ is produced by the ion plating method. The sample Nos. C1 to C3 and C5 show comparing materials prepared for comparison with the present invention.

In a second production method of the cutting tool material using the cubic boron nitride based sintered material, covered particles provided by covering the surface of cubic boron nitride powder with $Ti_{(1-x)}Al_xN$ are produced and are next sintered.

Concretely, titanium (Ti) powder and aluminum (Al) powder are mixed with each other by amounts corresponding to a desired composition of $Ti_{(1-x)}Al_xN$ and are sintered under vacuum and are used as targets of ion plating.

The cubic boron nitride powder having a particle diameter from 0.5 to 2 μm is arranged on a saucer capable of applying supersonic vibrations. PVD processing is performed while vibrations are applied to this cubic boron nitride powder. In a PVD processing condition, pressure is set to range from $1.0\times10^{-2}$ to $1.0\times10^{-3}$ torr and temperature is set to range from 200 to 600° C. As a result, the surface of the cubic boron nitride powder is directly covered with $Ti_{(1-x)}Al_xN$ so that covered particles are obtained.

The covered particles are also produced by directly covering the surface of the cubic boron nitride powder with $Ti_{(1-x)}Al_xN$ by the ion sputtering method instead of the above ion plating method.

Next, the obtained covered particles are mixed with $TiO_y$ and $Al_2O_3$ in accordance with necessity and are molded by a die to obtain a molding. This molding is laminated with a plate for a base seat similar to that in the above case and are sintered at an ultrahigh pressure. In a sintering condition, pressure is set to range from 2.0 to 7.0 GPa and temperature is set to range from 1150 to 1600° C. and a sintering time is set to range from 10 to 180 minutes.

Thus, cutting tool materials having various kinds of compositions of sample Nos. E11, E13, E14 and C4 are obtained as shown in the tables 1 and 2. Here, the sample No. E11 shows a cutting tool material in which the cubic boron nitride is covered with $Ti_{(1-x)}Al_xN$ by the above ion plating method. The sample Nos. E13, E14 and C4 show cutting tool materials in which the cubic boron nitride is covered with $Ti_{(1-x)}Al_xN$ by the above ion sputtering method. The sample No. C4 shows a comparing material.

Next, in a third production method of the cutting tool material using the cubic boron nitride based sintered material, covered particles obtained by a method similar to the above second production method and $Ti_{(1-x)}Al_xN$ powder obtained by a method similar to the first production method are used as raw materials. Then, $TiO_y$ and $Al_2O_3$ are added and mixed with these raw materials in accordance with necessity and are molded so that a mixing raw material is obtained.

Next, this mixing raw material is laminated with a plate molding body for a base seat similar to that in the above case and is sintered at an ultrahigh pressure so that a cutting tool material is obtained.

The composition of the obtained cutting tool is set by adjusting a compounding ratio of each of the powders. As a result, the samples of sample Nos. E2, E3, E5, E9, E10, E12, E15, C6 and C7 are obtained as shown in the tables 1 and 2. The sample Nos. C6 and C7 show comparing materials.

The value x of $Ti_{(1-x)}Al_xN$ in the cubic boron nitride based sintered material obtained in each of the above production methods is quantitatively determined by EDX (energy dispersion type X-ray analysis).

Figure 2:
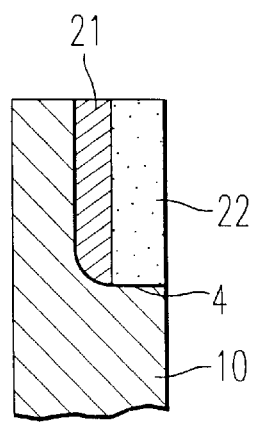
FIG. 2 is an explanatory view showing S-section of the cutting tool in FIG. 1 according to Embodiment 1.
Figure 3:
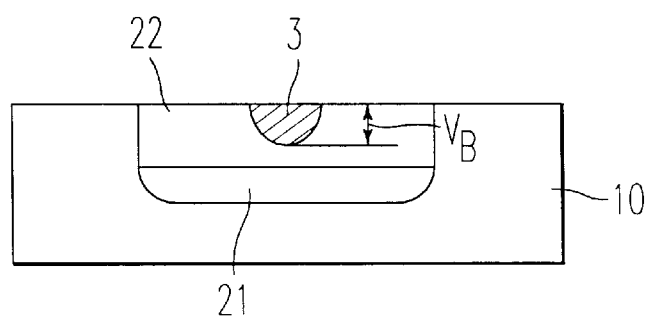
FIG. 3 is a plan view of the cutting tool showing wearing of an escaping face according to Embodiment 1.

As shown in FIGS. 1 and 2, each of the cutting tool materials (sample Nos. E1 to E15 and C1 to C7) obtained by each of the above production methods is soldered and joined to a base material 10 made of a cemented carbide and is processed as a cutting tool 1 having a shape of CCGW09T304 determined by JIS(Japanese Industrial Standard)-B4120. Namely, as shown in FIG. 2, in the cutting tool 1, a cutting tool material 2 is joined to an end tip of the base material 10 by a soldering material 4. The cutting tool material 2 is formed by laminating a cubic boron nitride based sintered material 22 with a plate 21 for a base seat.

Next, a cutting test is made by using each obtained cutting tool 1 in the following condition. Then, as shown in FIG. 3, the wearing amount $V_B$ (mm) of an escaping face 3 of the cutting tool 1 is measured and is set to an index of a tool life.

<Cutting condition>;

Cut material: spheroidal graphite cast iron round bar (FCD450-10, hardness: Hv169) having 110 mm in outside diameter $\phi$, cutting speed: 250 m/min, feed: 0.15 mm/rev, depth of cut: 0.3 mm, cutting oil: Chemicool SR-1 (trade mark), cutting length: 10 km.

The results of the cutting test are shown in the tables 1 and 2.

A cubic boron nitride sintered body tool conventionally used and commercially sold is prepared for comparison (sample No. C8) and is similarly tested. Sample Nos. C1 to C3 show comparing materials in which the value x of $Ti_{(1-x)}Al_xN$ is dislocated from its range in the present invention. Sample Nos. C4 and C5 show comparing materials for researching suitable compounding ratios of $Ti_{(1-x)}Al_xN$ and the cubic boron nitride. Sample Nos. C6 and C7 show comparing materials for researching suitable compounding ratios of $TiO_y$ and $Al_2O_3$.

As clearly seen from the tables 1 and 2, each of the sample Nos. E1 to E15 obtained in the present invention shows a preeminent long life in comparison with a conventional cubic boron nitride sintered body tool C8 commercially sold and also shows a notable long life in comparison with the sample Nos. C1 to C7 for comparison.

Thus, it is possible to provide a cutting tool in which high speed cutting of the spheroidal graphite cast iron conventionally desired can be realized in a long life, thereby contributing to a great improvement in productivity.

In the cutting tool material in this example, the spheroidal graphite cast iron difficult to be processed among cast iron can be processed at high speed such that the spheroidal graphite cast iron has a long life. Accordingly, the cutting tool material can be used while this cutting tool material also shows excellent performance with respect to general cast iron (FC material) relatively easy to be processed.

TABLE 1

| | | $Ti_{(1-x)}Al_xN$ | | | | | | | | cutting | |
| | | cBN coating | | powder | compounding amount | | | sintering condition | | test $V_B$ wearing | |
| sample No. | method | x-value | amount Vol % | compounding Vol % | cBN Vol % | $TiO_y$ Vol % | $Al_2O_3$ Vol % | pressure GPa | temperature ° C. | time min | amount mm |
|---|---|---|---|---|---|---|---|---|---|---|---|
| E1 | A | 0.1 | — | 36.8 | 63.2 | 5.3 | — | 4.2 | 1400 | 60 | 0.081 |
| E2 | B | 0.1 | 10 | 25 | 65 | — | — | 4.8 | 1450 | 30 | 0.075 |
| E3 | C | 0.1 | 5.3 | 21.0 | 73.7 | — | 5.3 | 5.4 | 1600 | 10 | 0.071 |
| E4 | A | 0.1 | — | 66.7 | 33.3 | 5.6 | 5.6 | 2.5 | 1150 | 150 | 0.153 |
| E5 | B | 0.1 | 5.3 | 78.9 | 15.5 | — | 5.3 | 2.0 | 1100 | 180 | 0.180 |
| E6 | A | 0.2 | — | 30 | 70 | — | — | 5.5 | 1500 | 50 | 0.138 |
| E7 | A | 0.3 | — | 44.4 | 55.6 | 5.6 | 5.6 | 4.0 | 1300 | 60 | 0.179 |
| E8 | A | 0.4 | — | 50 | 50 | — | — | 4.5 | 1350 | 40 | 0.185 |
| E9 | B | 0.5 | 10.5 | 31.6 | 57.9 | — | 5.3 | 5.0 | 1350 | 120 | 0.150 |
| E10 | B | 0.6 | 15 | 15 | 70 | — | — | 5.5 | 1450 | 30 | 0.137 |
| E11 | A | 0.6 | 26.3 | — | 73.7 | 5.3 | — | 6.0 | 1400 | 20 | 0.130 |

<$Ti_{(1-x)}Al_xN$ manufactring methods>
A: plasma CVD method,
B: ion plating method (PVD),
C: ion sputtering method (PVD),

TABLE 2

| sample No. | method | $Ti_{(1-x)}Al_xN$ cBN coating x-value | $Ti_{(1-x)}Al_xN$ powder amount Vol % | compounding Vol % | compounding amount cBN Vol % | compounding amount $TiO_y$ Vol % | compounding amount $Al_2O_3$ Vol % | sintering condition pressure GPa | sintering condition temperature °C. | cutting test $V_B$ wearing time min | cutting test $V_B$ wearing amount mm |
|---|---|---|---|---|---|---|---|---|---|---|---|
| E12 | C | 0.6 | 5.6 | 22.2 | 72.2 | 5.6 | 56 | 6.7 | 1500 | 10 | 0.134 |
| E13 | C | 0.6 | 10.5 | — | 89.5 | 5.3 | — | 6.5 | 1450 | 30 | 0.103 |
| E14 | C | 0.6 | 10 | — | 90 | — | — | 7.0 | 1500 | 30 | 0.115 |
| E15 | A | 0.7 | 10.5 | 21.1 | 68.4 | 5.3 | — | 5.2 | 1450 | 20 | 0.145 |
| C1 | A | 0 | — | 36.8 | 63.2 | — | 5.3 | 4.2 | 1400 | 60 | 0.329 |
| C2 | A | 0.03 | — | 40 | 60 | — | — | 4.8 | 1450 | 60 | 0.218 |
| C3 | B | 0.8 | — | 44.4 | 55.6 | 5.6 | 5.6 | 4.0 | 1300 | 60 | 0.315 |
| C4 | C | 0.2 | 5 | — | 95 | — | — | 5.5 | 1500 | 30 | 0.343 |
| C5 | A | 0.5 | — | 95 | 5 | — | — | 2.0 | 1200 | 180 | 0.205 |
| C6 | B | 0.4 | 6.25 | 37.5 | 56.25 | 25 | — | 3.5 | 1300 | 120 | 0.203 |
| C7 | A | 0.3 | 6.25 | 37.5 | 56.25 | — | 25 | 3.0 | 1300 | 120 | 0.202 |
| C8 | (comarcially sold cBN) TiC + $Al_2O_3$ = 40 | | | | 60 | — | — | — | — | — | 0.201 |

What is claimed is:

1. A method for producing a sintered cubic boron nitride material, comprising sintering a raw material obtained by mixing a powder of $Ti_{(1-x)}Al_xN$ having a crystal structure, wherein x=0.05–0.70, with a powder of cubic boron nitride.

2. The method according to claim 1, wherein the ratio of the powders is 1:9–9:1 by volume.

3. The method according to claim 1, wherein said powder of $Ti_{(1-x)}Al_xN$ having a crystal structure is obtained by an ion sputtering method.

4. The method according to claim 1, wherein said powder of $Ti_{(1-x)}Al_xN$ having a crystal structure is obtained by an ion plating method.

5. The method according to claim 1, wherein said powder of $Ti_{(1-x)}Al_xN$ having a crystal structure is obtained by a chemical vapor deposition method.

6. The method according to claim 1, wherein x=0.05–0.15.

7. The method according to claim 1, wherein x=0.50–0.70.

8. The method according to claim 1, wherein the particle diameter of the powder of $Ti_{(1-x)}Al_xN$ having a crystal structure is smaller than the particle diameter of the powder of the cubic boron nitride and does not exceed 10 μm.

9. The method according to claim 8, wherein the particle diameter of the powder of $Ti_{(1-x)}Al_xN$ having a crystal structure is equal to or smaller than 1 μm.

10. The method according to claim 8, wherein the particle diameter of the powder of the cubic boron nitride is 0.5–10 μm.

11. The method according to claim 8, wherein the particle diameter of the powder of the cubic boron nitride is 0.5–3 μm.

12. The method according to claim 8, wherein the particle diameter of the powder of the cubic boron nitride is 0.5–2 μm.

13. The method according to claim 1, comprising adding 0.2–11.1% by volume of $TiO_y$, wherein y=1~2, and/or $Al_2O_3$ to the sintered material.

14. A method for producing a sintered cubic boron nitride material, comprising sintering particles of cubic boron nitride whose surfaces are covered with 5–90% by volume of $Ti_{(1-x)}Al_xN$ having a crystal structure, wherein x=0.05–0.70.

15. The method according to claim 14, wherein x=0.05–0.15.

16. The method according to claim 14, wherein x=0.50–0.70.

17. The method according to claim 14, wherein the covered particles are obtained by an ion sputtering method.

18. The method according to claim 14, wherein the covered particles are obtained by an ion plating method.

19. The method according to claim 14, wherein the covered particles are obtained by a chemical vapor deposition method.

20. The method according to claim 14, wherein the particle diameter of the powder of the cubic boron nitride is 0.5–10 μm.

21. The method according to claim 20, wherein the particle diameter of the powder of the cubic boron nitride is 0.5–3 μm.

22. The method according to claim 20, wherein the particle diameter of the powder of the cubic boron nitride is 0.5–2 μm.

23. The method according to claim 14, comprising adding 0.2–11.1% by volume of $TiO_y$, wherein y=1–2, and/or $Al_2O_3$ to the sintered material.

24. A method for producing sintered cubic boron nitride material, comprising sintering a raw material obtained by mixing particles of cubic boron nitride whose surfaces are covered with $Ti_{(1-x)}Al_xN$ having a crystal structure, with a powder of $Ti_{(1-x)}Al_xN$ having a crystal structure, wherein x=0.05–0.70.

25. The method according to claim 24, wherein $Ti_{(1-x)}Al_xN$ is present in an amount of 10–90% by volume, based on cubic boron nitride.

26. The method according to claim 25, wherein the covering ratio of the $Ti_{(1-x)}Al_xN$ with respect to the cubic boron nitride is equal to or smaller than 30% by volume.

27. The method according to claim 24, wherein x=0.05–0.15.

28. The method according to claim 24, wherein x=0.50–0.70.

29. The method according to claim 24, wherein the covered particles are obtained by an ion sputtering method.

30. The method according to claim 24, wherein the covered particles are obtained by an ion plating method.

31. The method according to claim 24, wherein the covered particles are obtained by a chemical vapor deposition method.

32. The method according to claim 24, comprising adding 0.2–11.1% by volume of $TiO_y$, wherein y=1 or 2, and/or $Al_2O_3$ to the sintered material.

33. The method according to claim 24, wherein the particle diameter of the powder of the cubic boron nitride is 0.5–10 μm.

34. The method according to claim 24, wherein the particle diameter of the powder of the cubic boron nitride is 0.5–3 μm.

35. The sintered cubic boron nitride material obtained by the process of claim 1.

36. The sintered cubic boron nitride material obtained by the process of claim 14.

37. The sintered cubic boron nitride material obtained by the process of claim 24.

* * * * *